(12) United States Patent
Baudart

(10) Patent No.: US 7,963,589 B2
(45) Date of Patent: Jun. 21, 2011

(54) MOTOR VEHICLE DASHBOARD CROSS-MEMBER

(75) Inventor: Laurent Baudart, Fresnoy En Thelle (FR)

(73) Assignee: Faurecia Interieur Industrie, Nanterre (FR)

( * ) Notice: Subject to any disclaimer, the term of this patent is extended or adjusted under 35 U.S.C. 154(b) by 89 days.

(21) Appl. No.: 12/301,820

(22) PCT Filed: May 9, 2007

(86) PCT No.: PCT/FR2007/000783
§ 371 (c)(1),
(2), (4) Date: May 28, 2009

(87) PCT Pub. No.: WO2007/135262
PCT Pub. Date: Nov. 29, 2007

(65) Prior Publication Data
US 2010/0244491 A1 Sep. 30, 2010

(30) Foreign Application Priority Data
May 24, 2006 (FR) ...................................... 06 04695

(51) Int. Cl.
*B62D 25/14* (2006.01)

(52) U.S. Cl. ..................................... 296/193.02; 296/70

(58) Field of Classification Search ............. 296/193.02, 296/70, 72, 146.6
See application file for complete search history.

(56) References Cited

U.S. PATENT DOCUMENTS

| 2,065,378 | A | * | 12/1936 | Kling ............................... 52/842 |
| 6,145,271 | A | * | 11/2000 | Kossmeier et al. ............. 52/843 |
| 2005/0110302 | A1 | * | 5/2005 | Riha et al. ................ 296/193.02 |
| 2005/0134090 | A1 | | 6/2005 | Kring et al. |
| 2006/0033347 | A1 | | 2/2006 | Hauger et al. |
| 2007/0006986 | A1 | * | 1/2007 | Derleth et al. ................ 162/234 |
| 2007/0132280 | A1 | * | 6/2007 | Wolf ............................ 296/208 |
| 2007/0145188 | A1 | | 6/2007 | Specht |

FOREIGN PATENT DOCUMENTS

| DE | 10 2004 056 102 | 6/2005 |
| DE | 10 2005 012816 | 12/2005 |
| EP | 1 529 720 | 5/2005 |
| EP | 1 544 086 | 6/2005 |
| EP | 1 621 453 | 2/2006 |

OTHER PUBLICATIONS

International Search Report dated Nov. 7, 2007, from corresponding PCT application.

* cited by examiner

*Primary Examiner* — Dennis H Pedder
(74) *Attorney, Agent, or Firm* — Young & Thompson

(57) ABSTRACT

A motor vehicle instrument panel cross-member (1) includes a beam (2) extending substantially along a longitudinal direction and elements (4) for fixing the beam (2) on the vehicle structure including at least one plate (6) provided with a fixing orifice (8). The plate (6) is integral with the beam (2).

18 Claims, 7 Drawing Sheets

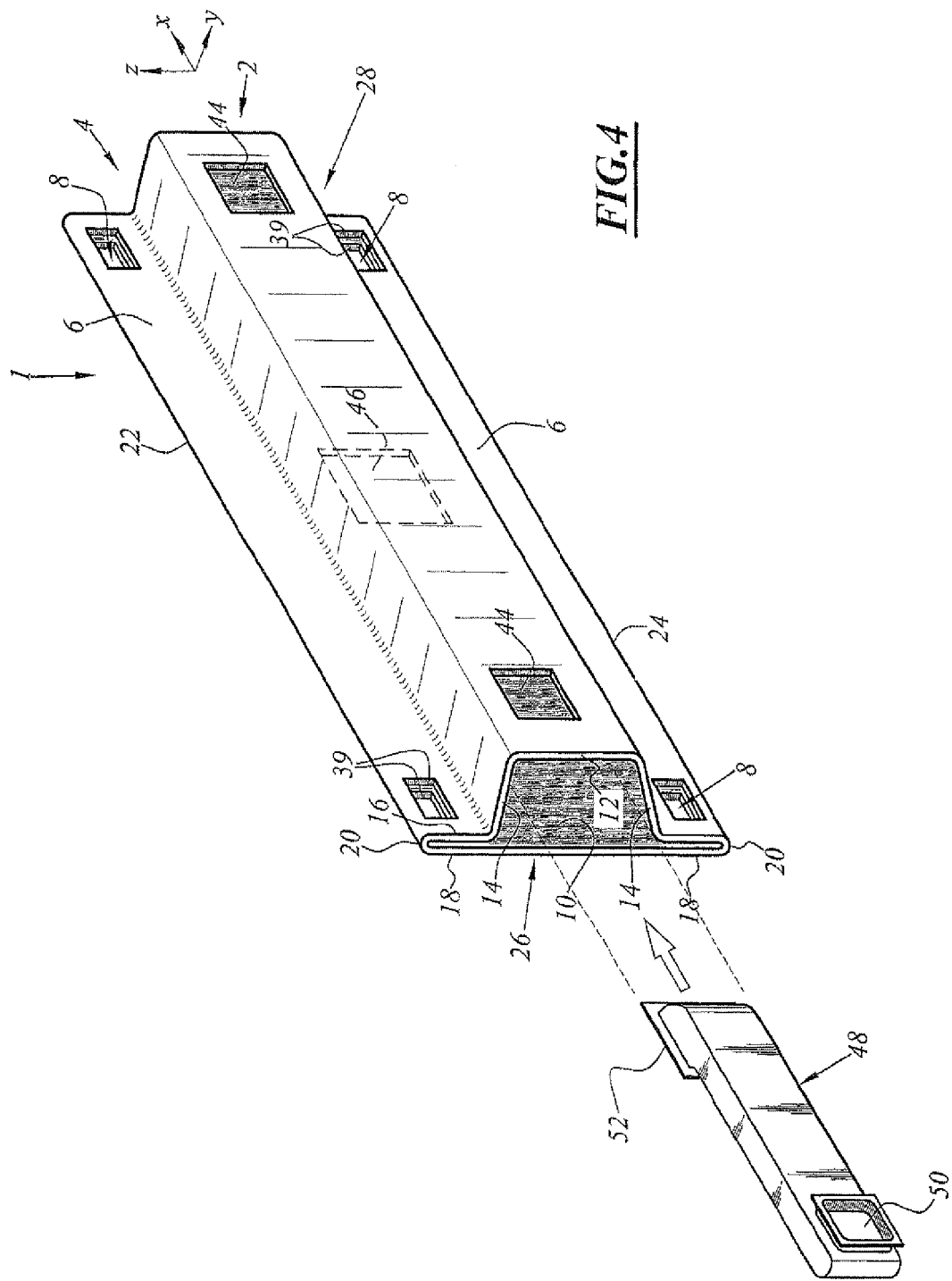

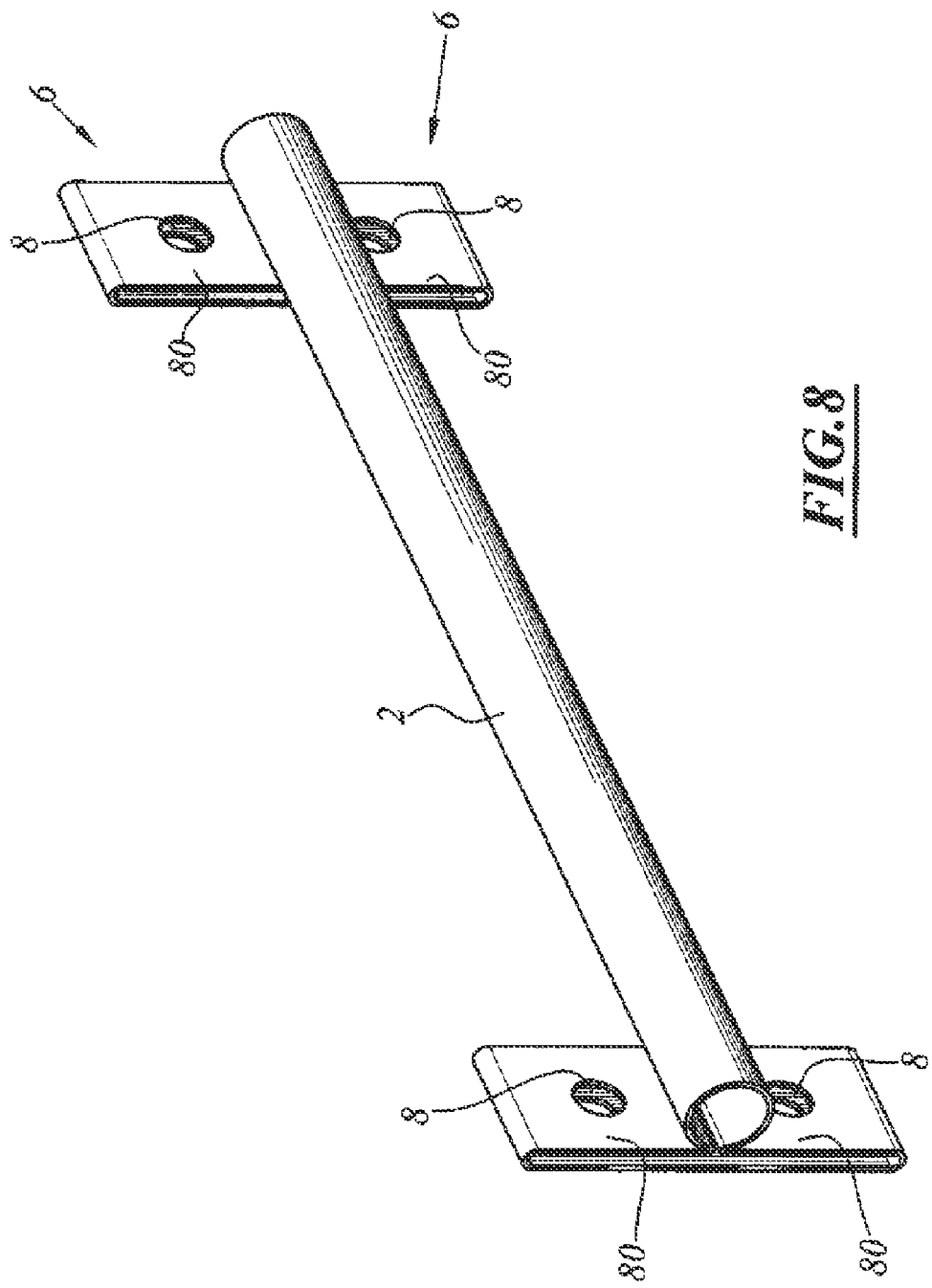

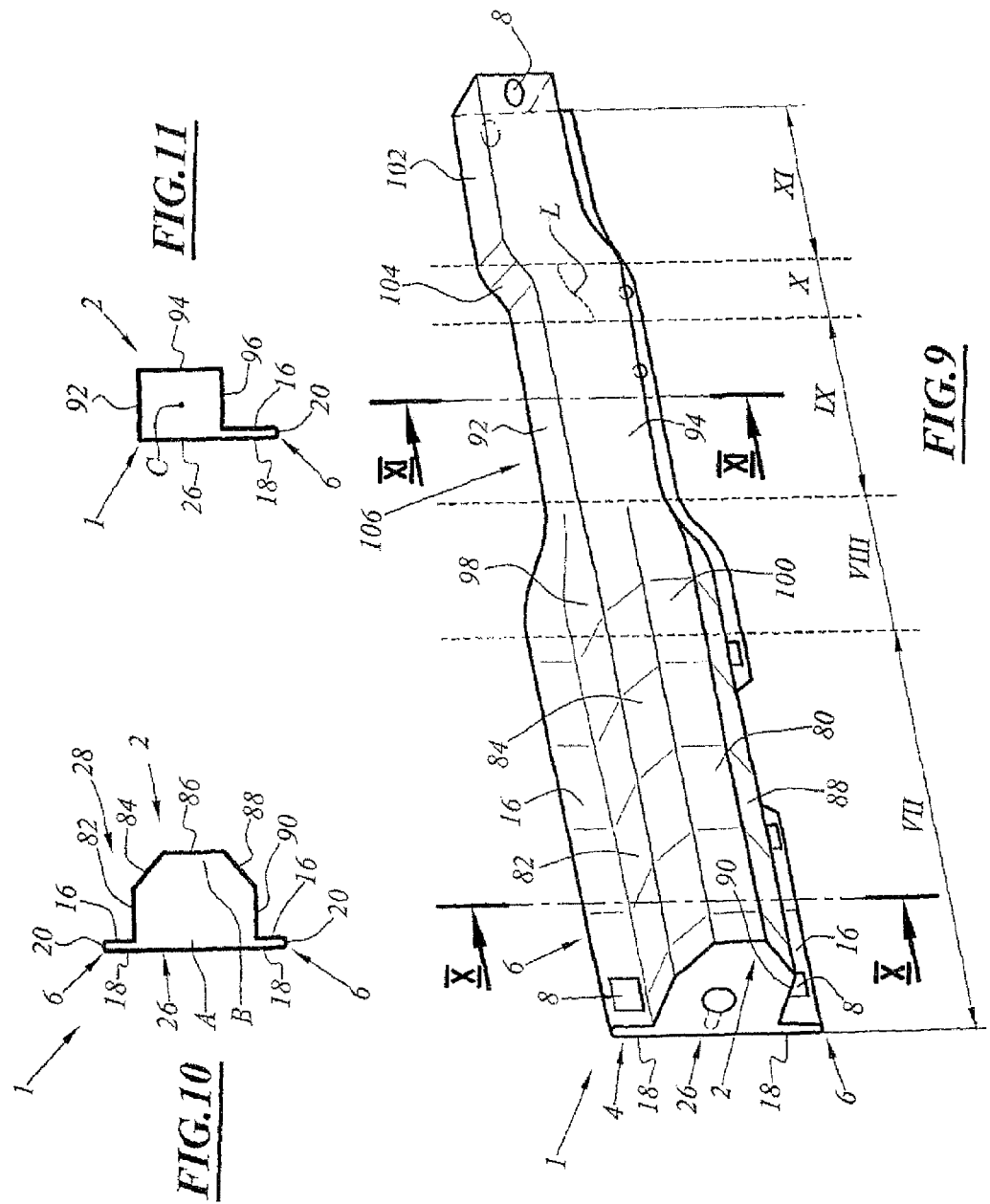

MOTOR VEHICLE DASHBOARD CROSS-MEMBER

The invention generally relates to a cross-member of a dashboard of a motor vehicle.

More specifically, the invention relates to a cross-member of a dashboard of a motor vehicle, of the type comprising a beam which substantially extends in a longitudinal direction and means for fixing the beam to the structure of the vehicle, comprising at least one plate which is provided with at least one fixing aperture.

There are known cross-members which are each provided with a tubular beam fixed to the vehicle by brackets which are secured to the two ends of the beam.

Therefore, the cross-member has a discontinuity of inertia between the beam and the fixing brackets. In order to compensate for that loss of inertia, the fixing brackets are securely welded to the beam. That weld is expensive and takes a long time to carry out.

In this context, the invention is intended to provide a cross-member of a dashboard which is rigid whilst still being less expensive to produce.

To that end, the invention relates to a cross-member of a dashboard of a motor vehicle of the above type, characterised in that the plate is integral with the beam.

The cross-member can also have one or more of the features below, considered individually or in accordance with any technically possible combination:
  the fixing means comprise two longitudinal plates, the plates being arranged at one side and the other of the beam and each carrying at least one fixing aperture;
  the or each plate extends substantially over the entire length of the beam;
  the cross-member is produced by bending and welding a metal strip, the or each fixing aperture being formed in the metal strip before bending;
  the metal strip is butt-welded over the entire longitudinal length of the cross-member;
  in the or each plate, the metal strip is folded into two thicknesses which are separated by a layer of air having a thickness less than two times the thickness of the metal strip;
  in the or each plate, the two thicknesses of the metal strip are welded to each other over the entire longitudinal length of the cross-member;
  the butt-weld passes through the beam;
  the metal strip has a thickness which varies longitudinally over the cross-member;
  the cross-member is produced by hydroforming or injection of metal;
  the beam has a trapezoidal cross-section;
  the cross-member has a hat-like cross-section and has a first large face which is substantially planar and a second large face which is opposite the first face and at which the beam projects;
  the beam has a circular cross-section;
  the cross-member has a variable cross-section when the cross-member is traveled along longitudinally;
  the cross-member comprises at least two longitudinal portions having constant cross-sections which are different from each other;
  the two longitudinal portions of the cross-member have cross-sections of different shapes; and
  the two longitudinal portions of the cross-member have cross-sections having different positions in a plane perpendicular relative to the longitudinal direction.

Other features and advantages of the invention will be appreciated from the description thereof given below by way of non-limiting example with reference to the appended Figures, in which:

FIG. 4 is a perspective view similar to that of FIG. 1, showing a construction variant of the cross-member, in which it is adapted to receive internally a ventilation conduit of the vehicle;

FIG. 8 is a perspective view of another embodiment of the cross-member;

FIG. 9 is a perspective view of another embodiment of the cross-member; and

FIGS. 10 and 11 are cross-sections of the cross-member of FIG. 9, considered in accordance with the incidence of arrows X and XI, respectively.

In the following description, reference will be made to longitudinal, transverse and vertical directions which are orthogonal in pairs and which are indicated by arrows X, Y and Z of FIG. 1.

Figure 1:
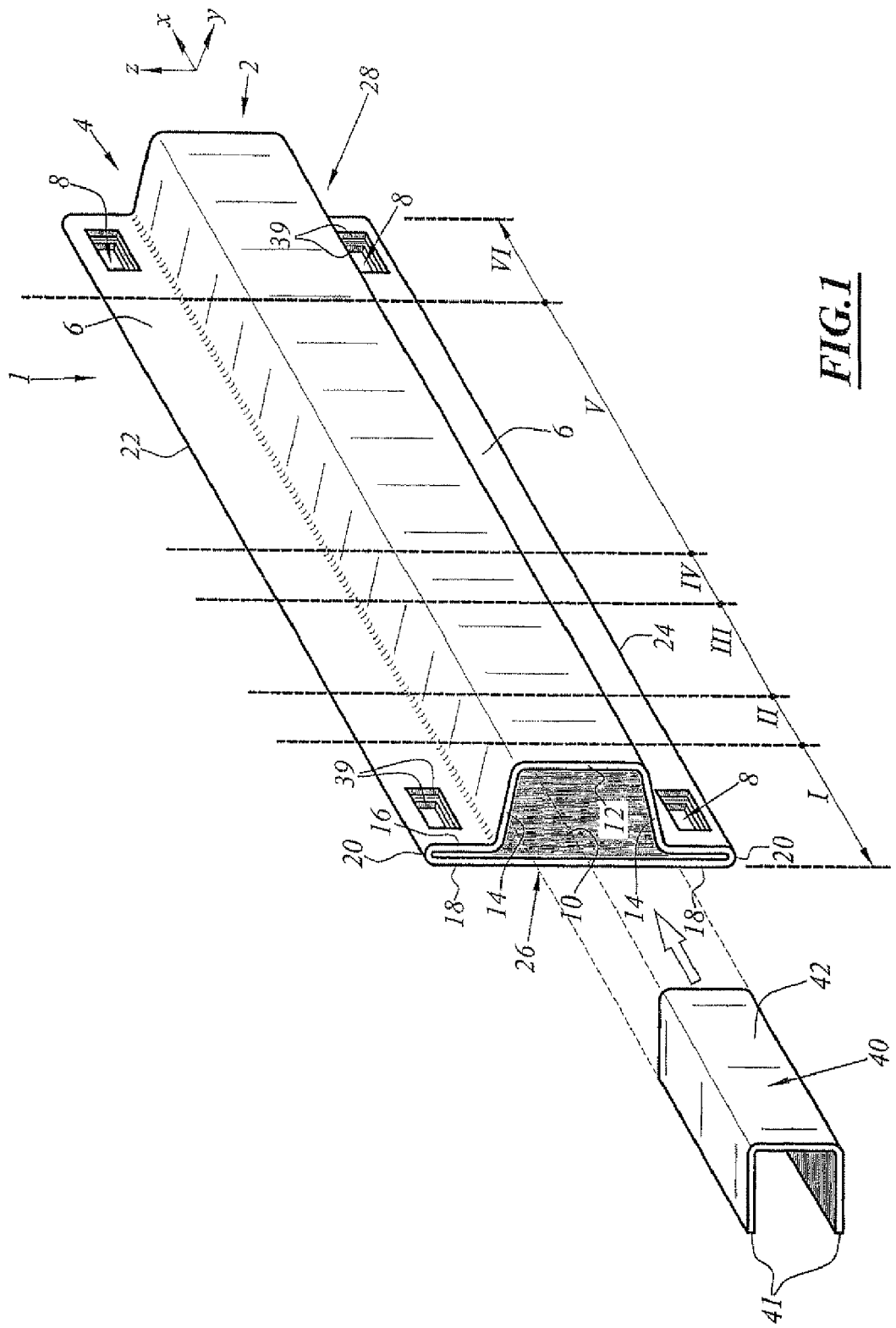
FIG. 1 is a perspective view of a cross-member of a dashboard according to the invention.

The cross-member 1 illustrated in FIG. 1 is intended to form a structural element of a dashboard of a motor vehicle. It extends in the longitudinal direction X. It comprises a longitudinal beam 2 and means 4 for fixing the beam 2 to the structure of the vehicle.

The fixing means 4 comprise two longitudinal side plates 6 which extend at one side and the other of the beam 2 and apertures 8 which extend through the plates 6. An aperture 8 is provided at each longitudinal end of each plate 6.

According to a first embodiment, the cross-member 1 is produced from a planar longitudinal metal strip. The metal strip is bent about longitudinal bending lines so as to produce a hollow profile-member having a predetermined cross-section. The cross-member 1 has the same cross-section over the entire longitudinal length thereof. At the end of the bending operation, the two opposing longitudinal free edges of the metal strip are arranged facing each other, in immediate proximity relative to each other. Those edges are subsequently welded to each other, as described below, so as to increase the rigidity of the cross-member.

As FIG. 1 shows, the beam 2 is hollow. It has a substantially trapezoidal cross-section. The beam 2 is delimited by a large substantially longitudinal and vertical base 10, a small base 12 which is also substantially longitudinal and vertical and two opposing oblique faces 14 which extend in longitudinal planes which are slightly inclined relative to the transverse direction Y.

In each of the two plates 6, the metal strip is folded into two thicknesses which are separated by a layer of air having a thickness which is less than two times the thickness of the metal strip. Therefore, each plate 6 has a U-shaped cross-section. Each plate 6 comprises a substantially longitudinal vertical branch 16 which is connected to an oblique face 14, a substantially longitudinal vertical branch 18 which is connected to the large base 10 and a bent portion 20 which joins the branches 16 and 18. The bent portion 20 is directed counter to the beam 2. The bent portion 20 of one of the plates 6 therefore defines an upper free longitudinal edge 22 of the cross-member. The bent portion 20 of the other plate 6 defines a lower longitudinal free edge 24 of the cross-member.

The arms 18 of the two plates 6 and the large base 10 of the beam 2 extend in the same plane and therefore define a first large face 26 of the cross-member. That face 26 is substantially planar and extends in a vertical longitudinal plane.

The branches 16 of the two plates, the inclined faces 14 and the small base 12 of the beam define a second large face of the cross-member that is designated 28. The beam 2 protrudes at the centre of the second large face 28. The branches 16 of the two plates are arranged in the same vertical longitudinal plane.

Therefore, the cross-member 1 is symmetrical relative to a longitudinal transverse median plane of the beam 2.

Figure 2:
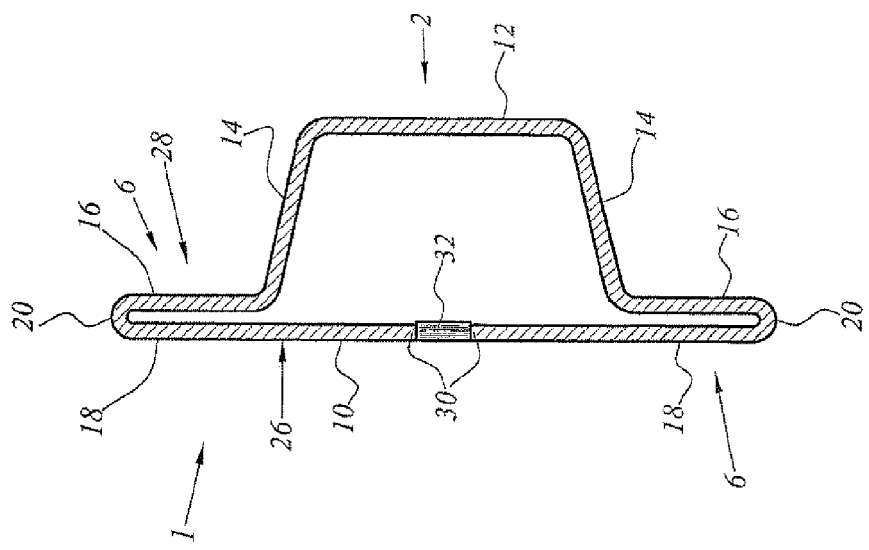

According to a first embodiment, illustrated in FIG. 2, the longitudinal edges 30 of the metal strip forming the cross-member, after bending, extend at the centre of the large face 26. They are fixedly joined to each other by a continuous weld which extends over the entire longitudinal length of the cross-member. That weld is brought about, for example, by means of a high-frequency welding device.

Figure 3:
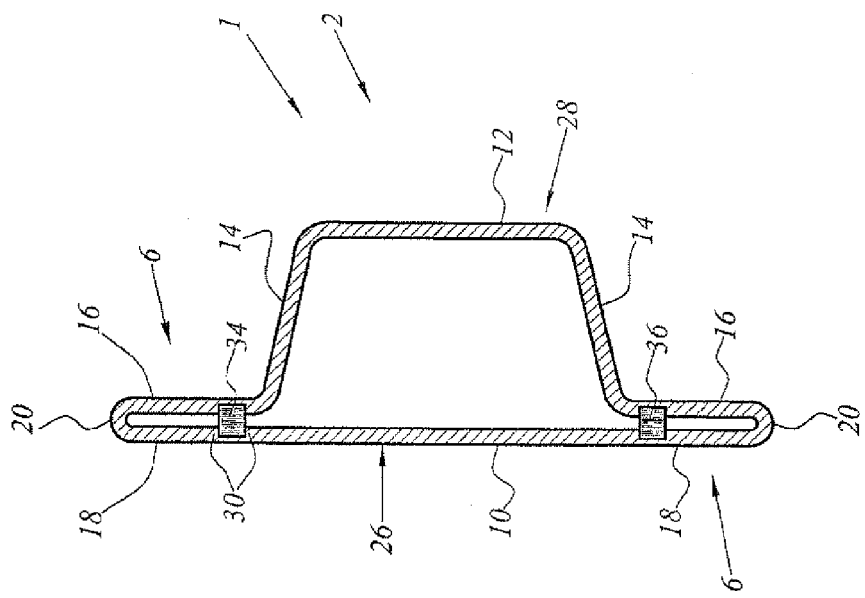
FIGS. 2 and 3 are cross-sections of the cross-member of FIG. 1, illustrating two construction variants of the welding of the beam.

In a second embodiment, illustrated in FIG. 3, the longitudinal edges 30 of the metal strip, after bending, extend over the first large face 26, at the junction between the branch 18 of the upper plate 6 and the large base 10 of the beam. The edges 30 are fixedly joined to each other by a longitudinal weld. Preferably, the weld extends over the entire longitudinal length of the cross-member. In a variant, the weld is carried out only at the two opposing longitudinal ends of the cross-member, for example, over 25% of the longitudinal length of the cross-member at each end. The weld 34 also joins the longitudinal edges 30 of the strip to the branch 16 of the plate 6, thereby conferring a closed cross-section on the plate 6 over at least a portion of the longitudinal length thereof. A second weld 36 is provided along the lower plate 6. It joins the branches 16 and 18 of the lower plate 6. It extends, for example, along the junction line between the branch 18 and the large base 10 of the beam 2. The welds 34 and 36 are typically brought about by means of a laser welding device.

As set out above, an aperture 8 is provided at each longitudinal end of each plate 6. The apertures 8 extend through the branches 16 and 18 of the corresponding plate. The apertures 8 are capable of receiving screws (not illustrated) for fixing the cross-member 1 to the structure of the vehicle.

In a particularly advantageous manner, the four apertures 8 are formed by constructing, in the metal strip, before bending, eight holes 39 at predetermined positions. After bending, the holes 39 are arranged in alignment two by two, in pairs. One hole of a pair is located in the branch 16 of a plate and the other hole of the same pair is located in the branch 18 of the same plate. The four pairs of holes 39 are arranged at the two longitudinal ends of the plates 6 and form the four apertures 8.

In a variant, the cross-member may comprise one or more local internal reinforcements 40. Those reinforcements 40 are typically U-shaped metal profile-members which are arranged inside the hollow central beam 2. The reinforcements are capable of being slid into the beam 2 from a longitudinal end of the cross-member. The free edges 41 of the profile-member 40 are in abutment against the large base 10 of the beam, and the web 42 of the profile-member is in abutment against the small base 12 of the same beam.

As illustrated in FIG. 4, the beam 2 may comprise openings 44 in its small base 10 and other openings 46 in its large base 12. For example, two openings 44 may be provided at the two opposing longitudinal ends of the small base 12. An opening 46 may be provided at the centre of the large base 10. In this manner, the cross-member 1 is capable of receiving, inside the beam 2, two ventilation conduits 48, each having an air inlet and an air outlet 50 and 52, respectively. The conduit 48 is provided so as to extend longitudinally along the beam 2, the air inlet 50 being arranged in alignment with the opening 44 and the air outlet 52 being arranged in alignment with the opening 46.

In a particularly advantageous manner, the metal strip which forms the profile-member has a thickness which varies longitudinally over the cross-member 1.

In FIG. 1, the cross-member has been subdivided into six successive portions which are successively numbered from to VI. The portions I and VI have the apertures 8 for fixing the cross-member to the structure of the vehicle. The portion III is capable of supporting the steering column. Furthermore, the cross-member 1 is capable of being supported by a strut (not illustrated) which rests on the floor of the vehicle. Means (not illustrated) for fixing the cross-member 1 to the strut are provided at a location at the boundary between the portions IV and V.

Figure 5:
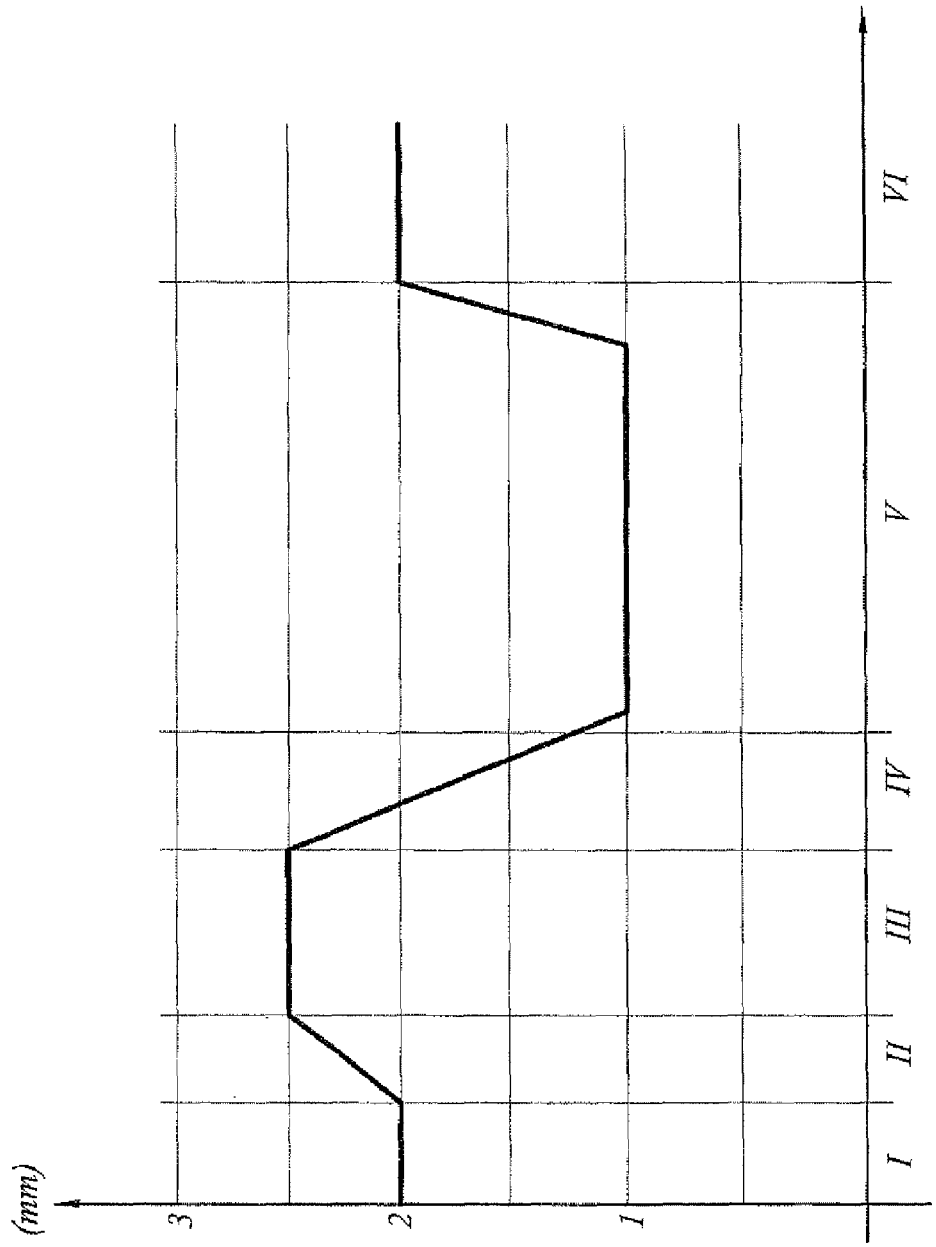
FIG. 5 is a graphic illustration of the thickness of the metal strip which forms the cross-member, in the longitudinal zones I to VI of the cross-member depicted in FIG. 1.

As FIG. 5 shows, the metal strip has a thickness of 2 mm in the portions I and VI. It has a thickness of 2.5 mm in the portion III and a thickness of 1 mm in practically the entire portion V. The strip has an increasing thickness in the portion II, changing from 2 mm near the portion I to 2.5 mm at the junction with respect to the portion III. Conversely, the strip has a decreasing thickness over the portion IV, changing from 2.5 mm at the junction with respect to the portion III to 1 mm at the junction with respect to the portion V. Finally, the portion V has, near the portion VI, a thickness which increases from 1 mm to 2 mm.

The above-described cross-member has a large number of advantages.

The fact that the plates for fixing the cross-member are integral with the central beam allows great rigidity to be conferred on the cross-member because there is no discontinuity of inertia between the beam and the fixing means.

The fixing holes are further produced in the metal strip which forms the cross-member before bending, at such positions that they are arranged in the two plates after bending.

In this manner, it is not necessary to weld fixing means which are secured to the central beam, which makes the cross-member particularly simple to construct.

It is further possible to provide reinforcements inside the central hollow portion, as required.

The cross-member also has the advantage of being able to receive aeraulic ventilation conduits of the vehicle.

It is also possible to vary the thickness of the metal strip longitudinally over the cross-member so as to adapt the strength of each portion of that cross-member to the constraints which apply to that portion. A substantial advantage in mass is thereby brought about.

Figure 7:
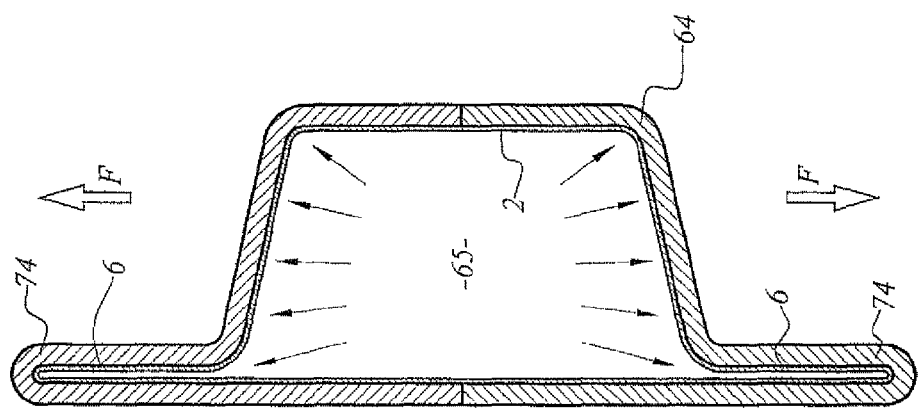
FIG. 7 is a view similar to that of FIG. 6, after the operation for hydroforming the blank.
Figure 6:
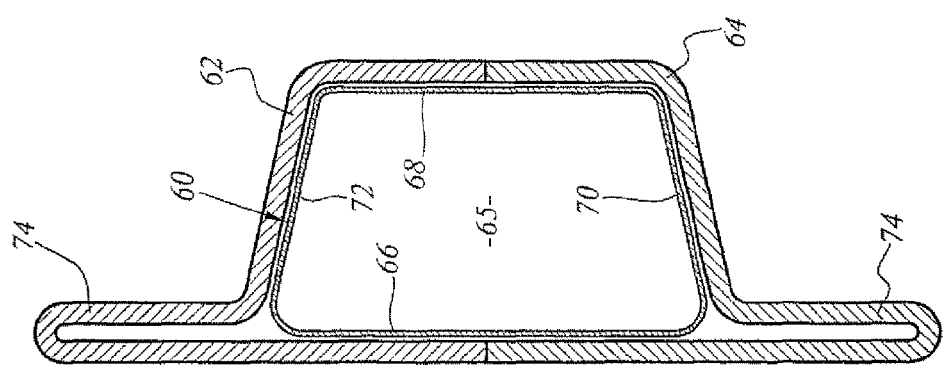
FIG. 6 is a cross-section of a hydroforming mould, in which a blank of the cross-member has been positioned.

In a second embodiment, the cross-member 1 may be constructed by hydroforming, as illustrated in FIGS. 6 and 7.

As illustrated in FIG. 6, a blank 60 of the cross-member 1 is arranged between two impressions 62, 64 of a mould, together defining a cavity 65 which has a shape which corresponds to the shape desired for the cross-member. The blank 60 initially has, for example, a trapezoidal cross-section with smooth walls 66, 68, 70, 72.

The cavity 65 generally has a cross-section whose shape is substantially similar to that of the blank 60, with slightly larger dimensions.

The impressions 62, 64 have oblong portions which project outwards from the mould, which are arranged facing each other and which are provided in order to form the plates 6.

In a manner known per se and as illustrated in FIG. 7, a pressurised liquid is introduced inside the blank 60 during a hydroforming step.

The pressurised liquid deforms and presses the blank 60 against the internal walls of the cavity 65 so that the blank 60 adopts the shape of the cavity 65.

The blank 60 is slightly deformed in the regions in which the cavity 65 has a cross-section which is substantially similar to that of the blank 60.

In the region of the recesses 74, the walls 70, 72 of the blank 60 are deformed to a greater extent in order to form the plates 6.

At the end of the hydroforming step, the blank 60 generally has the shape of the cross-member 1.

The impressions 62 and 64 are subsequently separated from each other in accordance with a movement indicated by the arrows F of FIG. 7 and the cross-member 1 is removed from the mould. Finally, the fixing apertures 8 are formed by punching the plates 6.

In accordance with another embodiment, the cross-member is constructed by injecting metal into a mould having an internal cavity in the shape of the cross-member 1. In this case, metals such as aluminium or magnesium are used. The fixing holes B are integrally moulded or are formed by punching, outside the mould.

The above-described cross-member may have a large number of variants.

It is possible far its cross-section not to be in the shape of a hat.

As illustrated in FIG. 8, the beam 2 may have a circular cross-section. In that case, the plates 6 are positioned at one side and the other of the beam 2 in a longitudinal vertical plane which is tangential relative to the beam 2. Those plates may, for example, be formed in accordance with the method described in the patent application filed under the number FR 05 03489. That method provides for a first hydroforming step, during which the beam 2 and a blank of the plates projecting relative to the beam 2 are formed. The blank is in the form of a longitudinal rib. Subsequently, during a second step, the blank is deformed by means of a punch which is applied to the free end of the rib in order to urge it towards the beam. The blank is flattened, thereby developing two wings perpendicularly relative to the direction of movement of the punch. Each wing is constituted by a U-shaped fold of material and forms one of the plates 6.

Alternatively, the beam 2 may have a cross-section which is square, rectangular, elliptical, or any other cross-section which allows the desired mechanical strength to be obtained for the cross-member.

The plates 6 may not extend over the entire longitudinal length of the beam 2. As illustrated in FIG. 8, for example, they may each be constituted by two longitudinal wings 80 which are positioned at the two opposite ends of the beam 2, each one being perforated by a fixing aperture 8.

Each wing 80 extends over a longitudinal length as a function of the rigidity desired for the cross-member.

Such plates 6 formed by two wings can be obtained, for example, by hydroforming or metal injection.

As a variant, each plate 6 may comprise, in addition to the two wings 80 arranged at the ends of the beam, one or more other longitudinal wings which are located along a central portion of the beam 2.

In accordance with another construction variant illustrated in FIGS. 9 to 11, the cross-member 1 has a cross-section which varies when the cross-member is traveled along longitudinally.

In FIG. 9, the cross-member 1 has been subdivided into five successive longitudinal portions which are designated from VII to XI, respectively.

The portion VII corresponds to the left-hand portion of the cross-member and extends longitudinally over approximately two fifths of the length of the cross-member. The portion XI corresponds to the right-hand portion of the cross-member and extends over approximately one fifth of the longitudinal length of the cross-member. The portions VIII and X are transition portions which are relatively short and together extend over approximately one fifth of the longitudinal length of the cross-member. The portion IX extends over approximately one fifth of the longitudinal length of the cross-member.

The cross-member 1 has a constant cross-section over the entire longitudinal length of each of the portions VII, IX and XI.

The cross-section of the portion VII is illustrated in FIG. 10.

The cross-member comprises, in the portion VII, two plates 6 which are similar to the plates of the cross-member illustrated in FIGS. 1 to 3 and a beam 2. The beam 2, when considered in cross-section, has, from the first large face of the cross-member, a rectangular zone A which is extended by a trapezoidal zone B. Therefore, the beam 2 is delimited at the upper side in FIG. 10 by a face 82 which is substantially perpendicular relative to the branch 16 of the upper plate, then by an oblique face 84, then by a face 86 which is parallel with the first large face 26 of the cross-member, then by a second oblique face 88, then by a face 90 which adjoins the branch 16 of the lower plate and which extends substantially perpendicularly relative to the branch 16. The faces 84 and 88 converge in the direction towards the face 86, the face 86 thereby constituting the small base of the trapezoidal portion B of the beam.

The cross-section of the portion IX is illustrated in FIG. 11. The cross-member 1, in this portion, does not have any upper plate and comprises only a lower plate 6 which is similar to the lower plate of the portion VII. The beam 2 has a rectangular cross-section which is slightly smaller than the zone A of the cross-section of the portion VII. The beam 2 is delimited at the upper side in FIG. 11 by a face 92 which is perpendicular relative to the first large face 26 of the cross-member and which is extended by a face 94 which is parallel with the first large face 26 and which is extended by a face 96 which is perpendicular relative to the first large face and which adjoins the branch 16 of the lower plate. The height of the beam 2 of the portion IX, that is to say, the spacing between the faces 92 and 96, is smaller than the height of the beam 2 in the portion VII, the height corresponding to the spacing between the faces 82 and 90.

The shape of the cross-section of the cross-member, in the portion XI, is substantially identical to that of the portion IX.

The portion VIII is a transition portion between the portions VII and IX. The cross-section of the cross-member varies continuously over the portion VIII and changes progressively from the shape which is illustrated in FIG. 10 and which corresponds to the cross-section of the portion VII to the shape which is illustrated in FIG. 11 and which corresponds to the cross-section of the portion IX.

The beam 2, in the portion VIII, is delimited at the upper side in FIG. 9 by a planar face 98 which brings about the connection between the face 82 and the face 92, the faces 82, 92 and 98 extending in the same plane.

The beam 2, in the portion VIII, is delimited opposite the first large face 26 by a face 100 which longitudinally extends the faces 84, 86 and 88 of the portion VII. The face 100 becomes progressively flatter as far as the face 94 of the portion TX. The beam 2 is delimited towards the lower side in FIG. 9 by a surface which is not visible and which connects the face 90 of the portion VII to the face 96 of the portion IX. The face 96 is located so as to be higher than the face 90 so that the lower face of the beam in the portion VIII substantially has an S-shaped profile. The upper plate 6, in the portion VIII, further becomes flatter from the portion VII and disappears at the junction between the portions VIII and IX. The lower plate 6 has, in the portion VIII, an S-shaped profile which extends from the portion VII as far as the portion IX.

The portion X is also a transition portion between the portions IX and XI. The cross-member has, over the portion X, a section which is of constant shape but which has a vertical position which varies over the portion X, the section becoming progressively displaced upwards. In this manner, the geometric centre C of the section of the beam 2 is displaced along an S-like line L which is visible in FIG. 9 when the portion X is followed longitudinally.

There is thus provided a recessed shape 106 above the portion IX of the cross-member which is capable of receiving, for example, an airbag module. The recessed shape 106 is delimited at the right-hand side by the upper face 104 of the portion X and, at the left-hand side, by the segment of the upper plate 6 which is in the portion VIII and which becomes progressively flatter. The airbag module may be completely received in the recessed zone 106 without projecting upwards above the upper face 102 of the portion. XI or above the upper plate 6 of the portion VII.

It is possible to provide for, the cross-member 1, other changes of shape and/or position of the cross-section, allowing spaces to be made free in order to receive other elements without modifying the mechanical or structural capacities of the cross-member. Those elements may be, for example, another airbag module, the steering column, members for displaying operating parameters of the vehicle, control members of the vehicle or any other similar equipment.

It is further possible to provide, in the recessed zone 106 or in any other recessed zone which is intended for another element, a fixing plate which is integral with the beam and which is similar to the fixing plate 6 which is provided for fixing the airbag module or any other element which is intended to be arranged in the recessed zone.

The fact that the cross-member has a variable cross-section when it is traveled along longitudinally allows optimisation of the weight and the spatial requirement of the cross-member in accordance with the mechanical strength sought for the cross-member, in accordance with the space available onboard the vehicle and in accordance with the components to be received onboard the vehicle. The term sectional variation is used in this instance to refer either to a variation in the shape of the section, such as over the portion VIII, or to a variation in the position of the section in a plane which is perpendicular relative to the transverse direction, such as over the portion X.

The cross-member of FIG. 9 may be obtained, as described above, from a longitudinal planar metal strip. The strip is subjected to a plurality of successive drawing operations, each operation allowing the metal strip to be bent about one or more longitudinal bending lines and also the faces of the cross-member in the portions VIII and X to be shaped.

The cross-member may have more or less than three portions of cross-sections which are constant and separated from each other by one or more portions of variable cross-section.

The portions having constant and variable cross-sections may have longitudinal lengths which are different from the values indicated above. For example, each portion of constant cross-section has a length greater than one eighth of the longitudinal length of the cross-member. For example, each portion of variable cross-section has a length greater than one tenth of the longitudinal length of the cross-member.

The invention claimed is:

1. A method of manufacturing a cross-member (1) of a dashboard of a motor vehicle, the method comprising the steps of:

obtaining a metal strip;

creating at least one pair of holes in the metal strip; and bending the metal strip after creating said one pair of holes so as to produce a hollow profile member comprising a beam (2) which extends substantially in a longitudinal direction and means (4) for fixing the beam (2) to the structure of the vehicle, said fixing means comprising two plates (6), at least one plate (6) positioned transversely on one side and another plate (6) on the other of the beam, at least one of which is;

each plate (6) being one piece with the beam (2), wherein in the plates (6), the metal strip is folded into two thicknesses which are separated by a layer of air having a thickness less than two times the thickness of the metal strip, and wherein the holes of the at least one pair of holes are in alignment with each other after bending, the at least one fixing aperture (8) being formed by the holes in alignment.

2. The method of claim 1, wherein the longitudinal plates (6) each carry at least one fixing aperture (8).

3. The method of claim 1, wherein, in the at least one plate (6) extends substantially over the entire length of the beam (2).

4. The method of claim 1, comprising the further step of welding the bended metal strip to itself such that the hollow profile member is closed along at least a part of its longitudinal length.

5. The method of claim 4, wherein the metal strip is butt-welded over the entire longitudinal length of the cross-member (1).

6. The method of claim 1, wherein, in the at least one plate (6), the two thicknesses of the metal strip are welded to each other over the entire longitudinal length of the cross-member (1).

7. The method of claim 5, wherein the butt-weld extends along the beam (2).

8. The method of claim 4, wherein the metal strip has a thickness which varies longitudinally over the cross-member (1).

9. The method of claim 1, comprising the further step of hydroforming or injection of metal.

10. The method of claim 1, wherein the beam (2) has a trapezoidal cross-section.

11. The method of claim 10, wherein the cross-member has a hat-like cross-section and has a first large face (26) which is substantially planar and a second large face (28) which is opposite the first face and at which the beam (2) projects.

12. The method of claim 1, wherein the beam (2) has a circular cross-section.

13. The method of claim 1, wherein the cross-member (1) has a variable cross-section when the cross-member (1) is travelled along longitudinally.

14. The method of claim 13, wherein the cross-member (1) comprises at least two longitudinal portions (VII, IX, XI) having constant cross-sections which are different from each other.

15. The method of claim 14, wherein the two longitudinal portions (VII, IX) of the cross-member (1) have cross-sections of different shapes.

16. The method of claim 14, wherein the two longitudinal portions (IX, XI) of the cross-member (1) have cross-sections having different positions in a plane perpendicular relative to the longitudinal direction.

17. The method of claim 2, wherein, in the at least one plate (6) extends substantially over the entire length of the beam (2).

18. The method of claim 2, wherein the method comprises the further step of welding the bended metal strip to itself such that the hollow member is closed along at least a part of its longitudinal length.

* * * * *